(12) United States Patent
Fan et al.

(10) Patent No.: US 8,292,309 B2
(45) Date of Patent: Oct. 23, 2012

(54) SUPPORTING DEVICE WITH WHEELS

(75) Inventors: Chen-Lu Fan, Taipei Hsien (TW);
Chih-Kun Shih, Santa Clara, CA (US);
Chun-Hsien Lin, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 356 days.

(21) Appl. No.: 12/701,688

(22) Filed: Feb. 8, 2010

(65) Prior Publication Data
US 2011/0095497 A1 Apr. 28, 2011

(51) Int. Cl.
*B62D 33/02* (2006.01)
(52) U.S. Cl. .................. 280/43.14; 280/79.11
(58) Field of Classification Search ........... 280/35, 280/38, 641, 39, 42, 651, 655.1, 654, 43.14, 280/43.15, 43.24, 47.12, 47.34, 47.371, 47.41, 280/2, 79.11, 79.3, 475, 491.1, 763.1, 30, 280/43, 43.1, 43.11, 43.12, 43.13, 43.16, 280/43.17; 16/18 R, 19, 45, 29, 30, 32, 33, 16/34, 18 CG
See application file for complete search history.

(56) References Cited

U.S. PATENT DOCUMENTS

| | | | | |
|---|---|---|---|---|
| 1,280,795 A * | 10/1918 | Martin | ............................. | 280/46 |
| 1,355,173 A * | 10/1920 | Shadel et al. | ................... | 296/13 |
| 2,008,887 A * | 7/1935 | Venables | ......................... | 280/35 |
| 2,319,581 A * | 5/1943 | Brownlee et al. | ......... | 280/43.14 |
| 2,587,688 A * | 3/1952 | Bosk | ............................... | 280/39 |
| 2,783,055 A * | 2/1957 | Michaud | ................... | 280/43.14 |
| 2,812,189 A * | 11/1957 | Geldhof | ..................... | 280/43.14 |
| 3,141,680 A * | 7/1964 | Goldwin et al. | ................ | 280/38 |
| 4,874,182 A * | 10/1989 | Clark | ............................. | 280/30 |
| 5,326,116 A * | 7/1994 | Flax | ......................... | 280/47.371 |
| 5,403,022 A * | 4/1995 | Snider | ............................. | 280/30 |
| 5,458,020 A * | 10/1995 | Wang | ............................. | 74/527 |
| 5,628,522 A * | 5/1997 | Hall | ......................... | 280/43.17 |
| 5,862,898 A * | 1/1999 | Chang | ........................... | 190/115 |
| 5,911,263 A * | 6/1999 | Wu | ................................... | 16/429 |
| 6,507,975 B2 * | 1/2003 | Maupin et al. | ..................... | 16/34 |
| 7,201,385 B2 * | 4/2007 | Renz et al. | ................. | 280/79.11 |
| 7,232,138 B2 * | 6/2007 | Shubert | ........................ | 280/79.4 |
| 7,464,947 B2 * | 12/2008 | Cortese | ...................... | 280/47.27 |
| 7,503,439 B2 * | 3/2009 | O'Shea et al. | .............. | 190/18 A |
| 7,784,816 B2 * | 8/2010 | Jian | ................................ | 280/651 |
| 7,819,409 B2 * | 10/2010 | Chang | ..................... | 280/47.371 |
| 7,997,591 B2 * | 8/2011 | Arthur | ............................ | 280/37 |
| 2007/0186827 A1 * | 8/2007 | Loftus et al. | ............... | 108/57.15 |
| 2008/0012260 A1 * | 1/2008 | Ouyang et al. | ............. | 280/79.11 |
| 2008/0174081 A1 * | 7/2008 | Wu | ............................ | 280/47.34 |

\* cited by examiner

*Primary Examiner* — John Walters
*Assistant Examiner* — Brian Swenson
(74) *Attorney, Agent, or Firm* — Altis Law Group, Inc.

(57) ABSTRACT

A supporting device includes a tray, a plurality of wheel assemblies, a handle, and a handgrip. The tray is configured for supporting a payload. The wheel assemblies are secured to the tray, and each wheel assembly includes a wheel. Each wheel is capable of rotating about a first axis. The wheel assemblies are rotatable between a first position and a second position, and a distance between each wheel and the tray in the first position is smaller than a distance between each wheel and the tray in the second position. The handle is attached to the tray and configured to urge the wheel assemblies to rotate from the first position to the second position. The handgrip is attached to the tray and configured to urge the wheel assemblies to rotate from the second position to the first position.

18 Claims, 4 Drawing Sheets

SUPPORTING DEVICE WITH WHEELS

BACKGROUND

1. Technical Field

The present disclosure relates to a supporting device with wheels.

2. Description of Related Art

Server racks are usually supported by posts. When moved, two or more persons are usually required to lift the server rack and then move it to a predetermined location. This is very inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
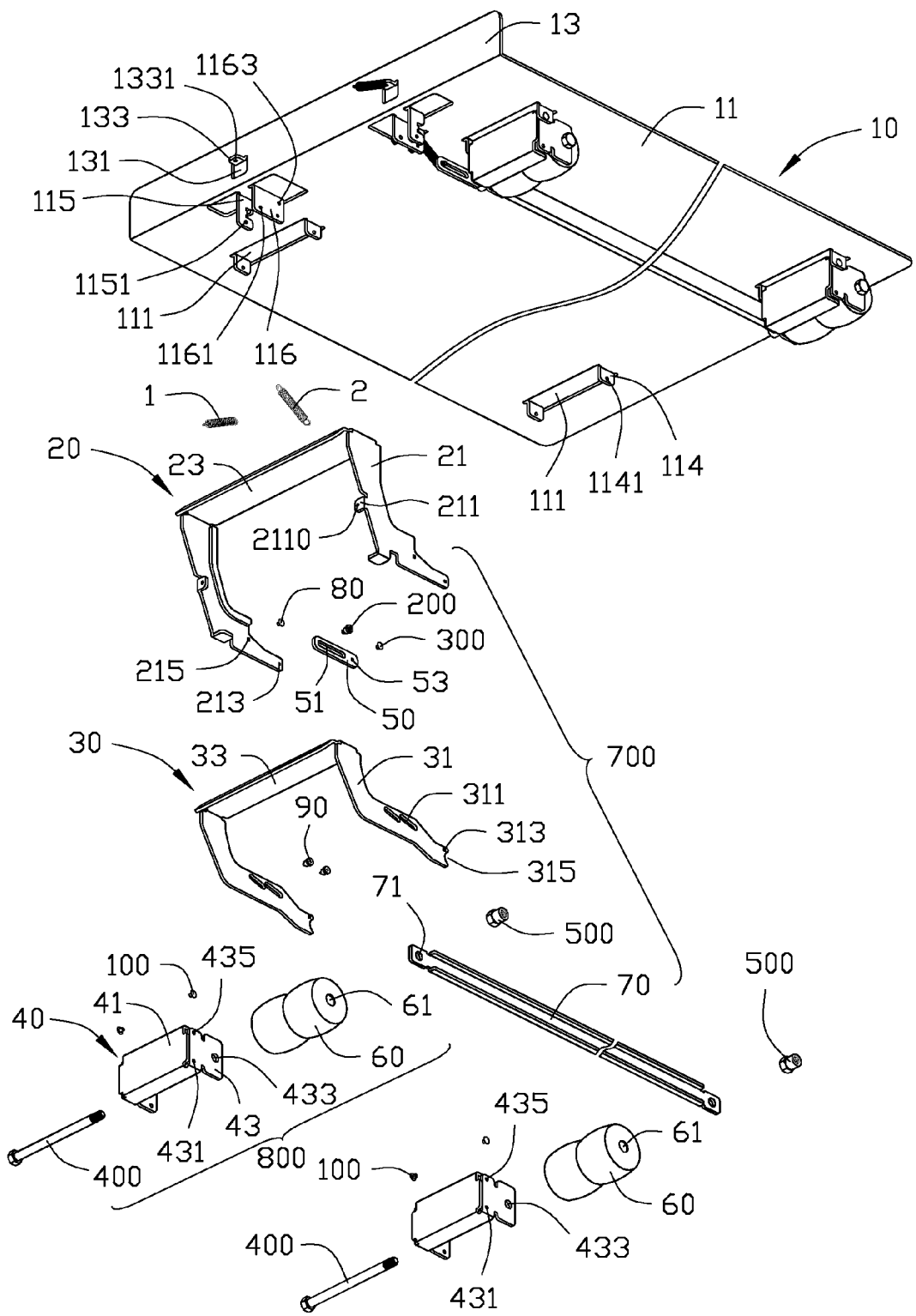
FIG. 1 is an partially exploded, isometric view of a supporting device in accordance with an embodiment.

Referring to FIG. 1, a supporting device, in accordance with an embodiment, includes a tray 10, a plurality of wheel assemblies 800, and an operating mechanism 700.

The tray 10 includes a tray main wall 11 and a tray sidewall 13 located on the tray main wall 11. In one embodiment, the tray sidewall 13 is perpendicular to the tray main wall 11. A plurality of through openings 111 is defined in the tray main wall 11. Two retaining pieces 114 each with a fastening hole 1141 are bent downward from opposite edges of each through openings 111. Two pivot pieces 115 and two mounting pieces 116 are located on a bottom surface of the tray main wall 11 adjacent to the tray sidewall 13. In one embodiment, the pivot pieces 115 and the mounting pieces 116 are perpendicular to the tray sidewall 13. The mounting pieces 116 are positioned between the pivot pieces 115. Each pivot piece 115 defines a pivot hole 1151. Each mounting piece 116 defines two screw holes 1161 adjacent to a bottom edge and a locking hole 1163 adjacent to a top edge. Two positioning tabs 133 are located on an outer surface of the tray sidewall 13. Each positioning tab 133 defines a positioning hole 1331.

Each wheel assembly 800 includes a bracket 40 and two wheels 60. Each bracket 40 includes a bracket main wall 41 and two bracket sidewalls 43. In one embodiment, the bracket sidewalls 43 are perpendicular to the bracket main wall 41. A receiving hole 433 is defined in each bracket sidewall 43. A first securing hole 431 and a second securing hole 435 are defined in each bracket sidewall 43. Each wheel 60 is configured to be received in each bracket 40, and defines a wheel hole 61.

The operating mechanism 700 includes a handle 20, a handgrip 30, two connecting braces 50, and two shafts 70. See FIG. 1, the handle 20, the handgrip 30, one connecting brace 50, one shaft 70 exploded from the tray 10 are shown as an example, and another connecting brace 50 and another shaft 70 is still assembled to the tray 10.

The handle 20 includes a grip portion 23 and two arm portions 21 extending from opposite ends of the grip portion 23. An arm portion tab 211 with a hook hole 2110 that is bent from the arm portion 21. A first fixing hole 213 and a second fixing hole 215 are defined in each arm portion tab 211.

The handgrip 30 includes a grip segment 33 and two arm segments 31 extending from opposite ends of the grip segment 33. Two sliding slots 311 are defined in each arm segment 31. A latch hole 313 and a cutout 315 are defined in a distal end of each arm segment 31.

Each connecting brace 50 defines an adjustment slot 51 and a connecting hole 53.

Each shaft 70 defines two axle holes 71 at two distal ends.

Figure 2:
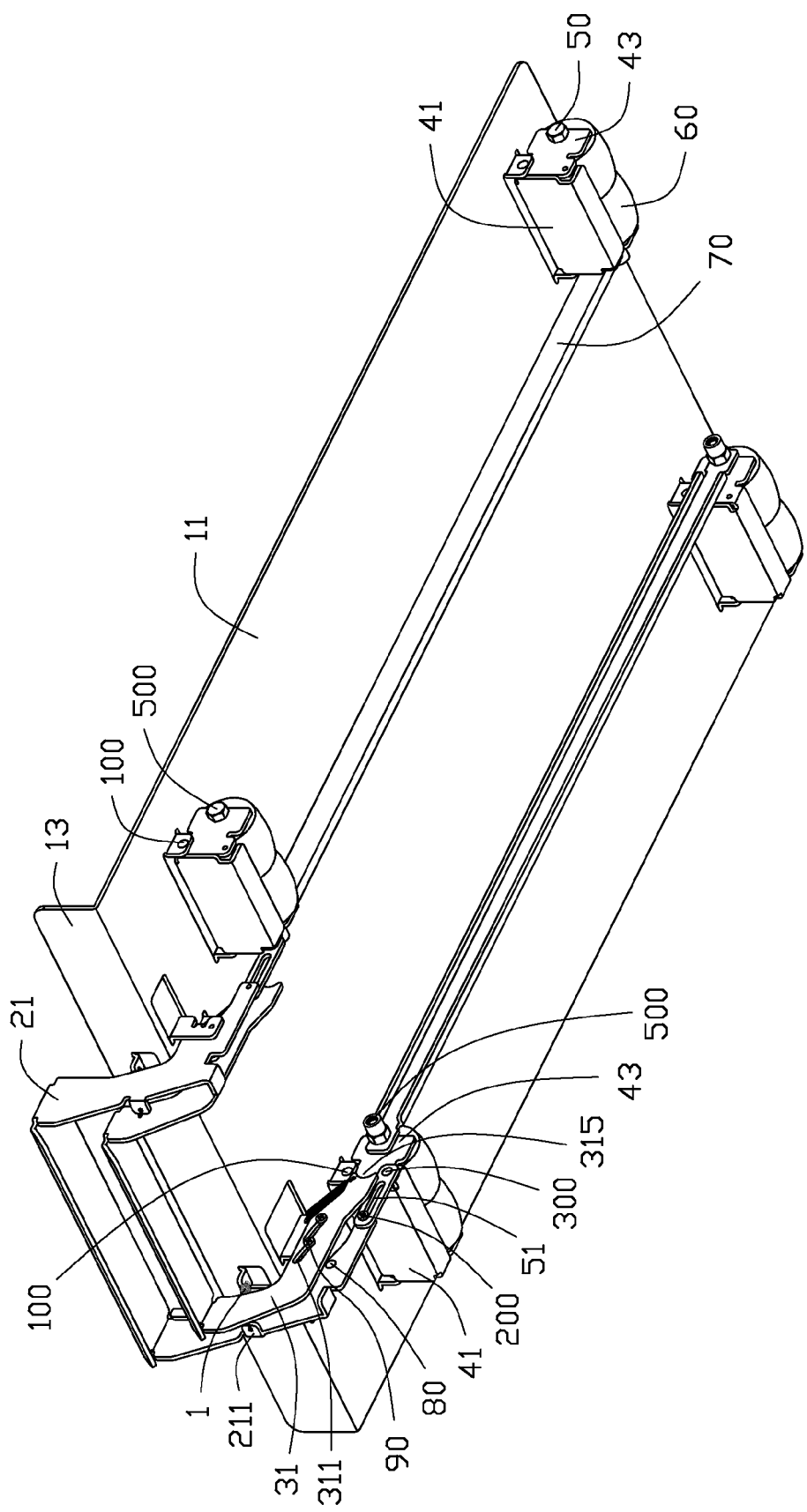
FIG. 2 is an assembled view of the supporting device of FIG. 1.

Referring also to FIGS. 1-2, in assembly of the supporting device, each bracket 40 is placed between the retaining pieces 114 of the tray main wall 11. The second securing holes 435 of the bracket sidewalls 43 are aligned with the fastening holes 1141. Two first fasteners 100, such as screws or nuts, are screwed in the second securing holes 435 and the fastening holes 1141, to secure each bracket 40 to the corresponding retaining pieces 114. Each bracket 40 is rotatable about the first corresponding fasteners 100 (i.e., a first axis) relative to the retaining pieces 114.

Two wheels 60 are placed between the bracket sidewalls 43 of each bracket 40. An axle 400 is inserted through the receiving holes 433 of each bracket 40 and the wheel holes 61 of two wheels 60, and a distal end of the axle 400 extends out of each bracket 40. Each connecting hole 70 is placed at one side of two bracket 40, and the distal ends of the axles 400 are inserted through the axle holes 71 of the connecting hole 70. The connecting hole 70 can connect between the brackets 40 allowing them to rotate simultaneously. A second fastener 500, such as a screw, is secured to the distal end of the axle 400, to fix the two wheels 60 in each bracket 40 and fix each connecting hole 70 to the corresponding two brackets 40. Each wheel 60 is rotatable about the axle 400 (i.e. a second axis) relative to the each bracket 40. The second axis is parallel to the first axis.

The handle 20 is placed on the tray main wall 11, and the arm portions 21 are respectively positioned between adjacent to the pivot piece 115 and the mounting piece 116. The pivot holes 1151 of the pivot pieces 115 are aligned with the second fixing holes 215 of the arm portions 21. Two third fasteners 80, such as screws or bolts, are screwed/bolted into the pivot holes 1151 and the second fixing holes 215, to secure the handle 20 to the pivot pieces 115. The handle 20 is rotatable with the third fasteners 80 (i.e. a third axis) relative to the pivot pieces 115.

Each connecting brace 50 is placed to align the adjustment slot 51 and the connecting hole 53 with the first fixing hole 213 of the handle 20 and the first securing hole 431 of the bracket 40, respectively. Two fifth fasteners 200, such as screws or nuts, are inserted through the adjustment slots 51 and screwed in the first fixing holes 213, to secure the connecting brace 50 to the arm portions 21 of the handle 20. The fifth fasteners 200 are slidable in the adjustment slots 51, and the connecting braces 50 are movable relative to the handle 20. Two sixth fasteners 300, such as screws or bolts, are secured into the connecting hole 53 and the first securing hole 431, to secure the connecting brace 50 to the bracket 40. The bracket 40 is rotatable relative to the connecting brace 50.

The handgrip 30 is located on the bottom surface of the tray main wall 11 of the tray 10, and the arm segments 31 are positioned between the mounting pieces 116. The screw holes 1161 of the mounting pieces 116 are corresponding to the sliding slots 311. Four seventh fasteners 90, such as screws or bolts, are inserted through the sliding slots 311 and screwed in the screw holes 1161 of the mounting pieces 116, to secure the handgrip 30 to the mounting pieces 116. The handgrip 30 is slidable relative to the mounting pieces 116, and the seventh fasteners 90 are slidable in the corresponding sliding slots 311.

Two first springs 1 are secured between the handle 20 between the tray sidewall 13. One end of each first spring 1 is secured in the positioning hole 1331 of each positioning tab 133 of the tray sidewall 13, and the other end thereof is secured in the hook hole 2110 of each arm portion tab 211 of handle 20. Two second springs 2 are secured between the tray main wall 11 and the handgrip 30. One end of each second spring 2 is secured in the locking hole 1163 of each mounting piece 116, and the other end thereof is secured in the latch hole 313 of the handgrip 30.

Figure 3:
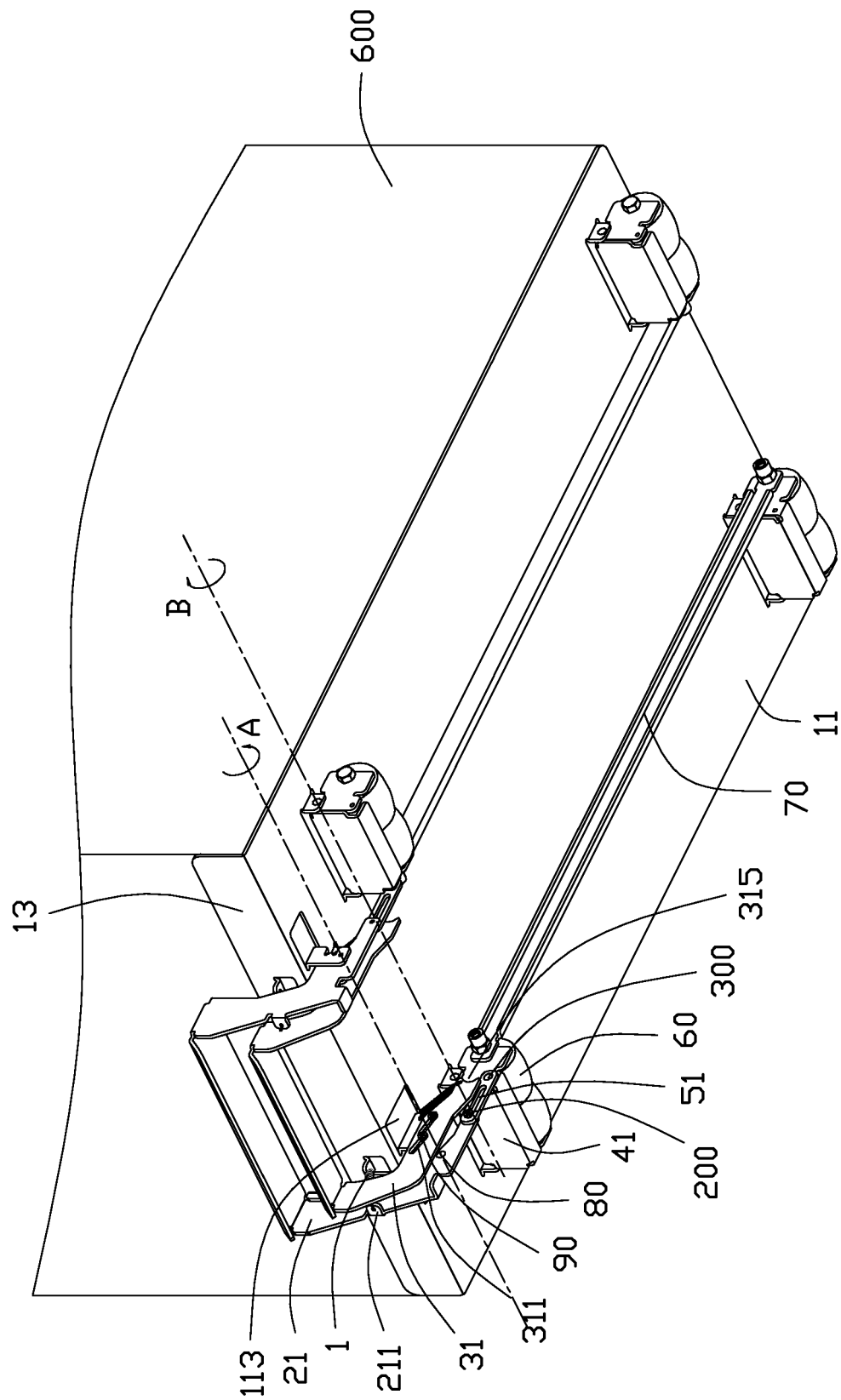
FIG. 3 is similar to FIG. 2, but showing a payload on the supporting device of FIG. 1 in use.

Referring to FIG. 3, in use, a payload 600, such as a server, is placed on the tray main wall 11. The handle 20 and the handgrip 30 have an original position. In the original position, the first springs 1 have original states. The fifth fasteners 200 abut an end of the adjustment slot 51 away from the sixth fasteners 300. The wheel assemblies 800 have a first position, where the main walls 41 of the brackets 40 are perpendicular to the tray main wall 11. The second springs 2 have original states. The cutouts 315 of the arm segments 31 of the handgrip 30 are away from the brackets 40.

In order to move the payload 600, the grip portion 23 is pushed downward to rotate the handle 20 along a first direction A. The first springs 1 are resiliently deformed. The connecting braces 50 are pulled by the fifth fasteners 200, to rotate the brackets 40 along a second direction B, until the main walls 41 are parallel to and abut the tray main wall 11. The wheel assemblies 800 are in a second position, where a distance between the second axis and the bracket main wall 41 is greater than a distance in the first position. Then the grip portion 23 is released, and the first springs 1 rebound to rotate the handle 20 to the original position. The handle 20 pushes the connecting braces 50 to rotate relative to the brackets 40 and the handle 20, until the handle 20 is in the original position. The connecting braces 50 are in a second position (see FIG. 4). The wheels 60 can be rolled on the ground about the axles 400, and the payload 600 can be thus moved to a predetermined position.

Figure 4:
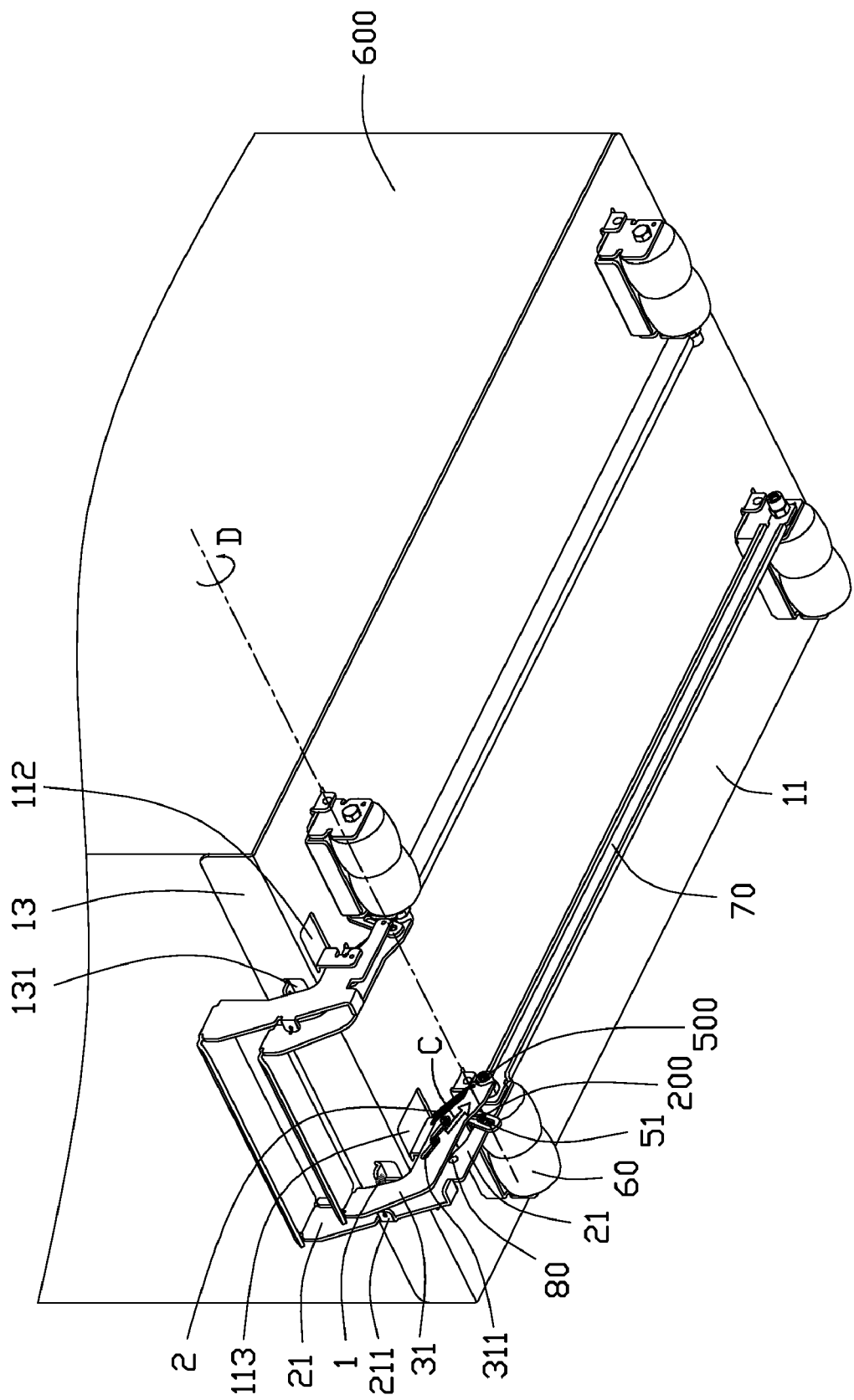
FIG. 4 is similar to FIG. 3, but showing an operating mechanism and the wheel assemblies in different positions.

Referring also to FIG. 4, after the payload 600 is moved to the predetermined position, the wheel assemblies 800 should be rotated from the second position to the first position along a direction opposite to direction B, in order to prevent the payload 600 from moving. The grip segment 33 of the handgrip 30 is pushed to move towards the tray sidewall 13 along a third direction C, and the second springs 2 are resiliently deformed. The arm segments 31 of the second component 30 push the brackets 40 to rotate wheel assemblies 800 along a direction D, until the wheel assemblies 800 are rotated from the second position to the first position. During rotation, the wheel assemblies 800 rotate the connecting braces 50, relative to the brackets 40 and the handle 20, until the wheel assemblies 800 is rotated to the first position. Therefore, the payload 600 cannot be moved with the supporting device.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A supporting device comprising:
a tray configured for supporting a payload;
a plurality of wheel assemblies secured to the tray, each wheel assembly comprising a wheel, the wheel assemblies being rotatable between a first position and a second position, a distance between each wheel and the tray in the first position being smaller than a distance between each wheel and the tray in the second position;
a handle attached to the tray and rotatable to rotate the wheel assemblies from the first position to the second position;
a handgrip attached to the tray and slidable to rotate the wheel assemblies from the second position to the first position;
two pivot pieces located on the tray; and
two mounting pieces located on the tray;
wherein the handle comprises two arm portions secured to the pivot pieces; the handle is rotatable relative to the pivot pieces; the handgrip comprises two arm segments secured to the pivot pieces; and the arm segments are slidable relative to the mounting pieces.

2. The supporting device of claim 1, wherein each wheel is rotatable about a first axis; each wheel assembly further comprises a bracket secured to the tray; the bracket is rotatable relative to the tray about a second axis that is parallel to the first axis; and the wheel is secured to the bracket.

3. The supporting device of claim 2, wherein each bracket comprises a bracket main wall parallel to the first axis; the tray comprises a tray main wall; each bracket is secured to the tray main wall; the bracket main wall is perpendicular to the tray main wall when each wheel assembly is in the first position and parallel to the tray main wall when each wheel assembly is in the second position.

4. The supporting device of claim 1, wherein a shaft is secured to two of the wheel assemblies to allow them to rotate simultaneously.

5. The supporting device of claim 1, wherein a connecting brace connects one wheel assembly and the handle; and the connecting brace is rotatable relative the handle and the wheel assembly.

6. The supporting device of claim 5, wherein the connecting brace defines an adjustment slot; a first fastener is inserted through the adjustment slot and secured to the handle; and the first fastener is slidable in the adjustment slot.

7. The supporting device of claim 1, wherein a first spring is secured on the handle and the tray.

8. The supporting device of claim 1, wherein each arm segment of the handgrip defines a sliding slot; a second fastener is inserted in the sliding slot of each arm segment and secured to each mounting piece; and the second fasteners are slidable in the sliding slots.

9. The supporting device of claim 1, wherein a second spring is secured between each mounting piece and each corresponding arm segment of the handgrip.

10. The supporting device of claim 1, wherein the two mounting pieces are positioned between the two pivot pieces.

11. A supporting device comprising:
a tray configured for supporting a payload, the tray comprising a tray main wall;
a plurality of wheel assemblies secured to the tray main wall, each wheel assembly comprising a bracket and a wheel secured to the bracket, the bracket comprises a bracket main wall, each wheel being rotatable relative to the bracket, the wheel assemblies being rotatable between a first position, where the bracket main wall is perpendicular to the tray main wall, and a second position, where the bracket main wall is parallel to the tray main wall; and
an operating mechanism attached to the tray and configured to urge the wheel assemblies rotate between the first position and the second position;
wherein a shaft is secured to two of the plurality of wheel assemblies to allow them to rotate simultaneously.

12. The supporting device of claim 11, wherein the operating mechanism comprises a handle and a handgrip; the handle is rotatable relative to the tray to urge the wheel assemblies to rotate from the first position to the second position; and the handgrip is slidable relative to the tray to urge the wheel assemblies to rotate from the second position to the first position.

13. The supporting device of claim 12, wherein a connecting brace connects one wheel assembly and the handle; and the connecting brace is rotatable relative the handle and the wheel assembly.

14. The supporting device of claim 13, wherein the connecting brace defines an adjustment slot; a first fastener is inserted through the adjustment slot and secured to the handle; and the first fastener is slidable in the adjustment slot.

15. The supporting device of claim 12, wherein a first spring is secured between the handle and the tray; and a second spring is secured between the handgrip and the tray.

16. The supporting device of claim 12, wherein two mounting pieces and two pivot pieces are located on the tray main wall; the handle is secured to the pivot pieces, and the handgrip is secured to the mounting pieces; and the two mounting pieces are positioned between the two pivot pieces.

17. The supporting device of claim 11, wherein each wheel is rotatable about a first axis; and the bracket is rotatable relative to the tray about a second axis that is parallel to the first axis.

18. A supporting device comprising:
a tray configured for supporting a payload, the tray comprising a tray main wall;
a plurality of wheel assemblies secured to the tray main wall, each wheel assembly comprising a bracket and a wheel secured to the bracket, the bracket comprises a bracket main wall, each wheel being rotatable relative to the bracket, the wheel assemblies being rotatable between a first position, where the bracket main wall is perpendicular to the tray main wall, and a second position, where the bracket main wall is parallel to the tray main wall; and
an operating mechanism attached to the tray and configured to urge the wheel assemblies rotate between the first position and the second position;
wherein each wheel is rotatable about a first axis; and the bracket is rotatable relative to the tray about a second axis that is parallel to the first axis.

* * * * *

UNITED STATES PATENT AND TRADEMARK OFFICE
CERTIFICATE OF CORRECTION

PATENT NO. : 8,292,309 B2
APPLICATION NO. : 12/701688
DATED : October 23, 2012
INVENTOR(S) : Chen-Lu Fan, Chih-Kun Shih and Chun-Hsien Lin Page 1 of 1

It is certified that error appears in the above-identified patent and that said Letters Patent is hereby corrected as shown below:

Title Page insert Item (30) "Foreign Application Priority Data"

-- (30)      Foreign Application Priority Data

Oct. 23, 2009   (CN) ........................200920313217.2 --

Signed and Sealed this
Fifteenth Day of October, 2013

Teresa Stanek Rea
*Deputy Director of the United States Patent and Trademark Office*